US008758017B2

(12) United States Patent
Chai et al.

(10) Patent No.: US 8,758,017 B2
(45) Date of Patent: Jun. 24, 2014

(54) TEACHING MATERIAL GENERATION METHODS AND SYSTEMS

(75) Inventors: Jing-Jing Chai, Taipei (TW); Li-Yuan Chen, Taipei (TW); Meei-Yuan Fann, Taipei (TW)

(73) Assignee: National Taiwan University, Taipei (TW)

( * ) Notice: Subject to any disclaimer, the term of this patent is extended or adjusted under 35 U.S.C. 154(b) by 1348 days.

(21) Appl. No.: 12/125,287

(22) Filed: May 22, 2008

(65) Prior Publication Data

US 2008/0299523 A1    Dec. 4, 2008

(30) Foreign Application Priority Data

May 31, 2007  (TW) .............................. 96119448 A (51) Int. Cl.
*G09B 19/06* (2006.01)

(52) U.S. Cl.
USPC ........................................... 434/157; 434/156

(58) Field of Classification Search
USPC ................................................ 434/156, 157
See application file for complete search history.

(56) References Cited

U.S. PATENT DOCUMENTS

| | | | | |
|---|---|---|---|---|
| 3,724,102 A | * | 4/1973 | Van Patten | 434/157 |
| 4,247,995 A | * | 2/1981 | Heinberg | 434/185 |
| 4,311,465 A | * | 1/1982 | Jacobs | 434/157 |
| 4,774,666 A | * | 9/1988 | Miyao et al. | 704/2 |
| 5,581,602 A | * | 12/1996 | Szlam et al. | 379/88.05 |
| 5,868,576 A | * | 2/1999 | Maruta | 434/157 |
| 5,882,202 A | * | 3/1999 | Sameth et al. | 434/157 |
| 5,934,708 A | * | 8/1999 | Batjuk | 283/46 |
| 6,024,571 A | * | 2/2000 | Renegar | 434/157 |
| 6,296,487 B1 | * | 10/2001 | Lotecka | 434/118 |
| 6,804,508 B1 | * | 10/2004 | Yamada | 455/414.1 |
| 7,165,972 B1 | * | 1/2007 | Jones | 434/157 |
| 2002/0072039 A1 | * | 6/2002 | Rtischev et al. | 434/157 |
| 2004/0029084 A1 | * | 2/2004 | Johnson et al. | 434/169 |
| 2004/0067780 A1 | * | 4/2004 | Eiden | 455/567 |
| 2005/0048449 A1 | * | 3/2005 | Marmorstein et al. | 434/157 |
| 2007/0015121 A1 | * | 1/2007 | Johnson et al. | 434/156 |
| 2007/0122774 A1 | * | 5/2007 | Wang | 434/169 |
| 2008/0254433 A1 | * | 10/2008 | Woolf et al. | 434/332 |

* cited by examiner

*Primary Examiner* — Robert J Utama (57) ABSTRACT

Teaching material generation methods and systems to generate teaching material for language learning are provided. The system comprises a plurality of social circumstances, a plurality of contextual situations, a user interface and a processing module. The user interface receives a selection corresponding to at least one of the social circumstances, and a selection corresponding to at least one of the contextual situations. The processing module generates teaching material according to the selected social circumstance and the selected contextual situation.

26 Claims, 10 Drawing Sheets

A: 請問,這位是誰? Excuse me, who is this?
B: 我幫你們介紹一下,這位是于先生. Let me introduce you, this is Mr. Yu.

FIG. 6A

A: 我給你介紹一下,這是我爸爸與媽媽. Let me introduce you, this is my father and mother
B: 伯父,伯母,兩位好. Sir, madam, and how are you.

FIG. 6B

A: 請問台北車站要怎麼走? Excuse me, do you know how to get to Taipei Main Station?
B: 搭捷運或公車都可以. You can take MRT or bus to get there.

FIG. 7A

A: 到圖書館要走多久? How long does it take to walk to the library?
B: 半個鐘頭. A half an hour.

A: 請問一支鉛筆多少錢? Excuse me, how much is one pencil?
B: 一支鉛筆 12 元. One pencil is 12 NT dollars.

FIG. 10A

A: 請問這是什麼? Excuse me, what is this?
B: 這是蘋果. This is an apple.

FIG. 10B

TEACHING MATERIAL GENERATION METHODS AND SYSTEMS

BACKGROUND OF THE INVENTION

1. Field of the Invention

The disclosure relates generally to teaching material generation methods and systems, and, more particularly to methods and systems that generate teaching material according to social circumstances and contextual situations.

2. Description of the Related Art

For language learning, teaching material is one of the main reasons leading to the success or failure of learning. For current language learning systems, teaching material is produced according to viewpoint of designers. Generally, the designers design the teaching material according to language learning theories or personal experiences. However, the designed learning experiences for different languages may not be precisely imitated due to different language properties. Also, teaching material designed according to the personal experiences of designers may be suitable for only some learners.

Additionally, teaching material is usually designed in chapters and sections. Respective chapters or sections are designed for specific topics, and set in order. Once the teaching material has been designed, it cannot be changed. Learners must learn according to the chapters and sections in sequence. However, since respective learners may have respective learning objectives, the arrangement of teaching material is inflexible for preferred adjustment by learners.

In some on-line learning systems, learners can select the teaching material of specific chapters or sections for learning, without reference to the predefined sequence of chapters and sections. However, since the teaching material is still fixed and designed according to the experiences of designers, it is also inflexible for adjustment by learners. Accordingly, a large divergence in learning success may occur for different learners, when using the same teaching material.

BRIEF SUMMARY OF THE INVENTION

Teaching material generation methods and systems to generate teaching material for language learning are provided.

In an embodiment of a teaching material generation method, a plurality of social circumstances and a plurality of contextual situations are provided. A selection corresponding to at least one of the social circumstances, and a selection corresponding to at least one of the contextual situations are received. Teaching material is generated according to the selected social circumstance and the selected contextual situation.

In another embodiment of a teaching material generation method, a plurality of social circumstances and a plurality of contextual situations are provided. A plurality of basic sentence patterns is provided. A selection of at least one of the basic sentence patterns is received. Teaching material for the selected basic sentence pattern is generated according to the social circumstances and the contextual situations.

An embodiment of a teaching material generation system comprises a plurality of social circumstances, a plurality of contextual situations, a user interface and a processing module. The user interface receives a selection corresponding to at least one of the social circumstances, and a selection corresponding to at least one of the contextual situations. The processing module generates teaching material according to the selected social circumstance and the selected contextual situation.

Another embodiment of a teaching material generation system comprises a plurality of social circumstances, a plurality of contextual situations, a plurality of basic sentence patterns, a user interface and a processing module. The user interface receives a selection of at least one of the basic sentence patterns. The processing module generates teaching material for the selected basic sentence pattern according to the social circumstances and the contextual situations.

Teaching material generation methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Teaching material generation methods and systems are provided.

Figure 1:
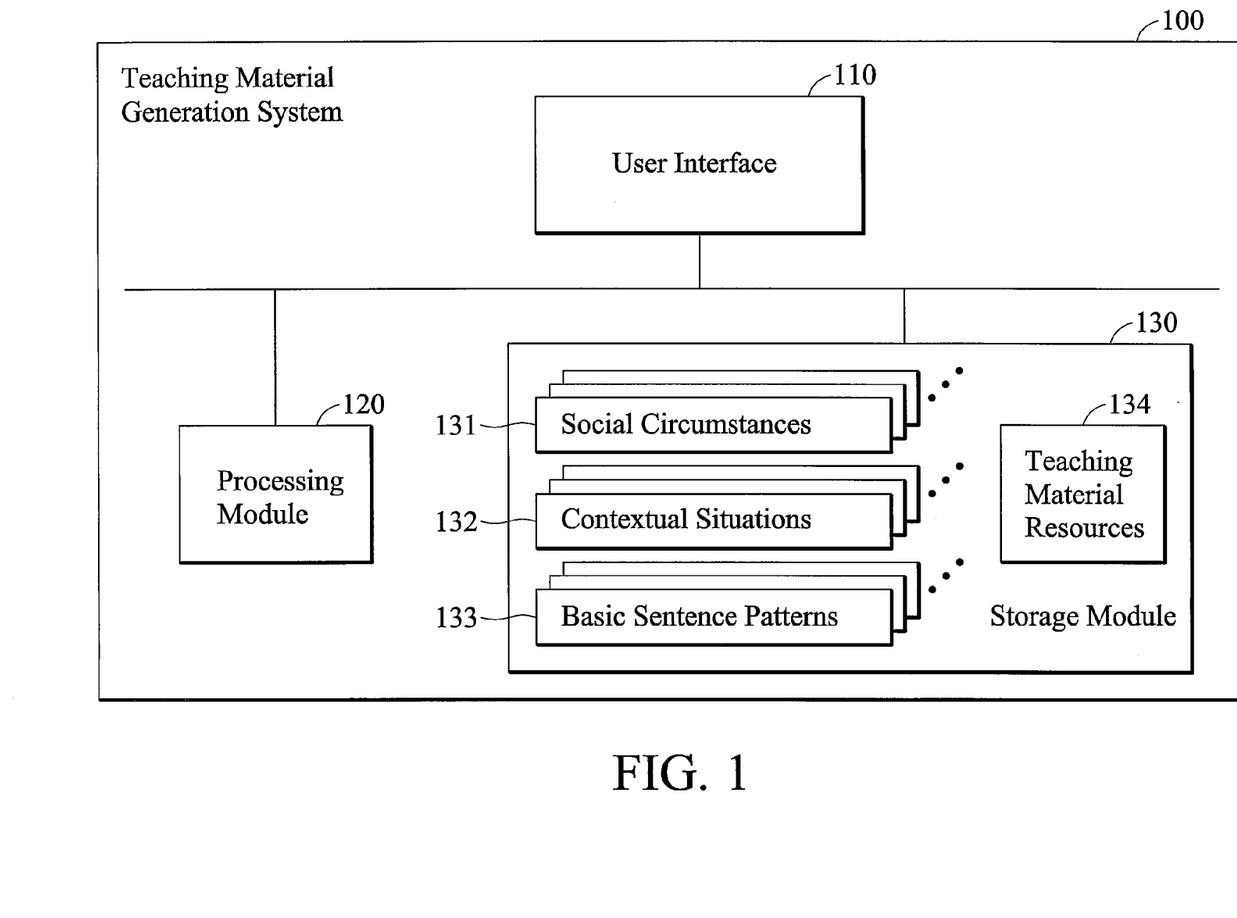
FIG. 1 is a schematic diagram illustrating an embodiment of a teaching material generation system according to the invention.

FIG. 1 is a schematic diagram illustrating an embodiment of a teaching material generation system according to the invention.

The teaching material generation system 100 may be a language learning system to generate teaching material for language learning such as Chinese. In some embodiments, the teaching material generation system 100 may be installed in a network, providing users' access via the network. In some embodiments, the teaching material generation system 100 may be installed in the host such as a computer system of the user. The teaching material generation system 100 comprises a user interface 110, a processing module 120, and a storage module 130.

The user interface 110 receives inputs from users, and displays teaching material and related information. The processing module 120 performs the teaching material generation method of the invention according to the inputs from users. Related detail is discussed later. The storage module 130 comprises indices, such as social circumstances 131, contextual situations 132 and basic sentence patterns 133, and teaching material resources 134. The social circumstances 131 comprise greetings, requests, descriptions, praising, apologizing, invitations, responses, promising, declining, farewell, and others. The contextual situations 132 comprise people, events, times, locations, objects, expressions, and others. The expressions may be the expressions toward elders, friends, strangers, strong affirmation, dislike, and others. The basic sentence patterns 133 comprise repetitive questions, alternative questions, questions with modal particles at the end of sentences, direct questions with question words, negative questions with main verbs, tag questions, indirect morphology, and others.

It is understood that speech interaction between people are usually propelled and linked based on several social circumstances. Since generality exists among different languages, and only expressions may be different in respective languages, learners can communicate accurately and fluently according to various tasks if they can indeed master the social circumstances of language. Accordingly, teaching material is generated based on the social circumstances in the invention. It is understood that the teaching material resources 134 comprise teaching material generated according to the social circumstances 131, the contextual situations 132 and/or the basic sentence patterns 133, and auxiliary teaching material corresponding to the teaching material is generated, such as characters, vocabulary, explanations, sample sentences, and/or grammar theory. In some embodiments, the teaching material may comprise content of at least one group of questions and responses, thereby completing the selected social circumstance request defined by a specific contextual situation. It is noted that the social circumstances, the contextual situations, and the basic sentence patterns are not limited to above examples.

In the invention, flexible generation methods are provided to generate teaching material for various requirements according to the indices, such as the social circumstances, the contextual situations, and the basic sentence patterns.

Figure 2:
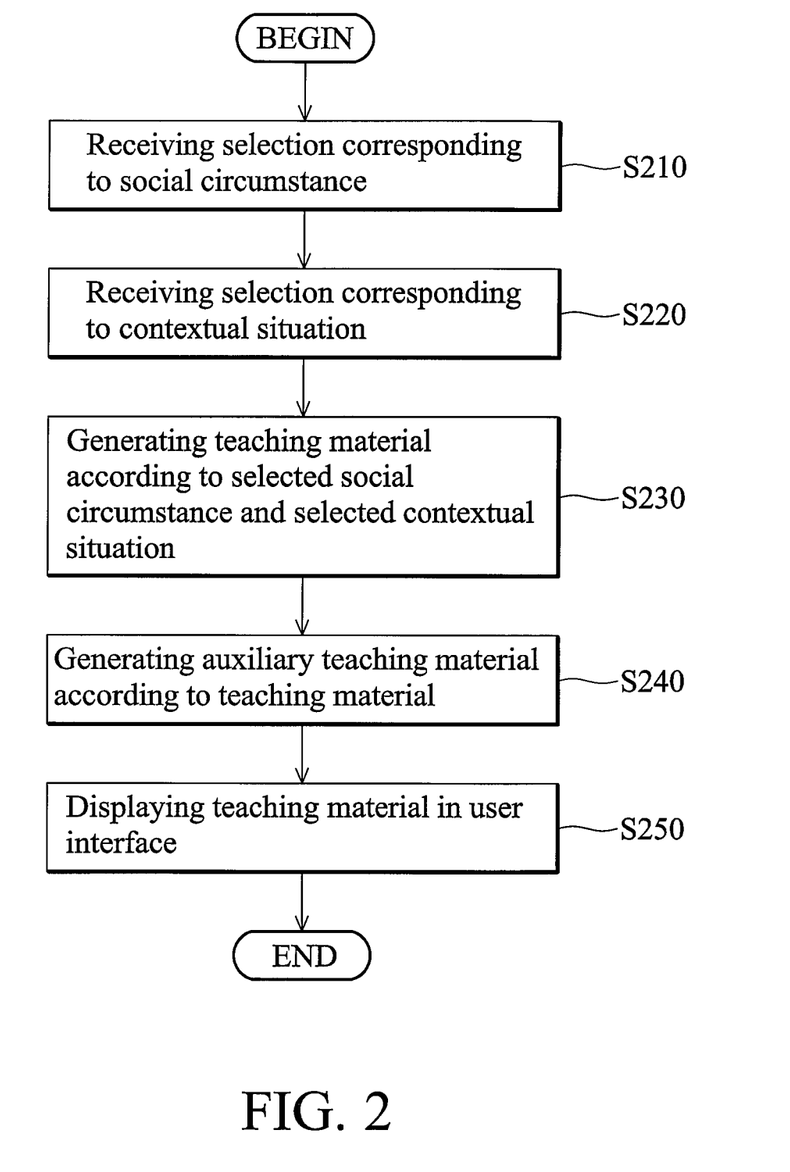
FIG. 2 is a flowchart of an embodiment of a teaching material generation method according to the invention.

FIG. 2 is a flowchart of an embodiment of a teaching material generation method according to the invention. In this embodiment, users can learn a specific social circumstance of a language under a specific contextual situation.

Figure 3:
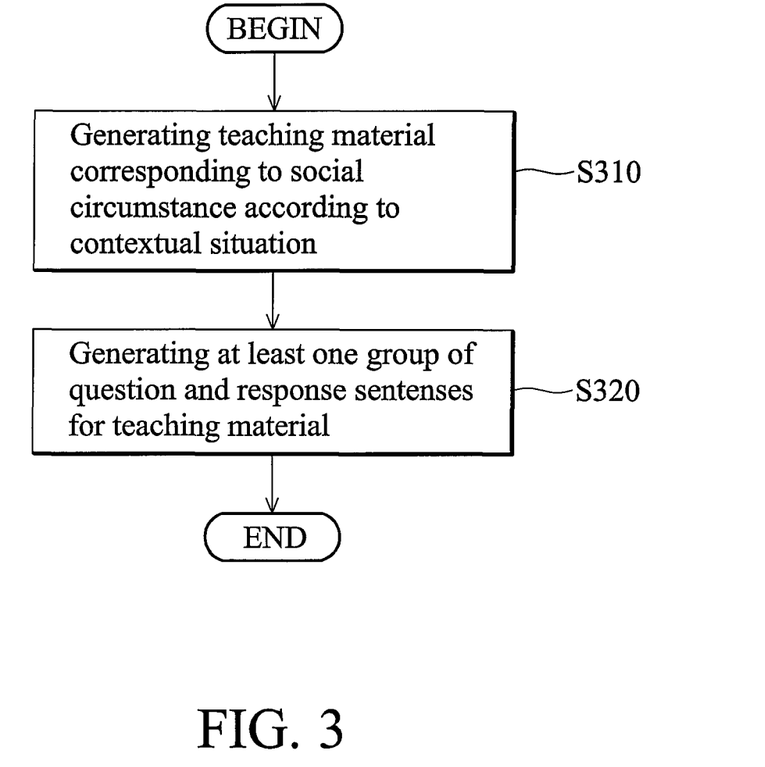
FIG. 3 is a flowchart of another embodiment of a teaching material generation method according to the invention.

In step S210, a selection corresponding to at least one of a plurality of social circumstances is received, and in step S220, a selection corresponding to at least one of a plurality of contextual situations is received. In step S230, teaching material is generated according to the selected social circumstance and the selected contextual situation. It is understood that the teaching material is generated in the steps shown in FIG. 3. In step S310, teaching material corresponding to the selected social circumstance is generated according to the selected contextual situation, and in step S320, at least one group of question and response content is generated as teaching material, thereby completing the selected social circumstance request defined by the selected contextual situation. Then, in step S240 of FIG. 2, auxiliary teaching material, such as characters, vocabulary, explanations, sample sentences, and/or grammar theory are generated according to the generated teaching material. In step S250, the generated teaching material and the auxiliary teaching material are displayed in the user interface. In some embodiments, the teaching material and the auxiliary teaching material can be retrieved from teaching material resources in the storage module. The teaching material may define several tags related to the respective auxiliary teaching material. The auxiliary teaching material corresponding to specific teaching material can be located according to the tags. In some embodiments, the teaching material, the auxiliary teaching material, or part of the teaching material and the auxiliary teaching material may have a link. If the link is selected, specific data corresponding to the teaching material and the auxiliary teaching material is displayed in the user interface for further learning. It is understood that, in the above embodiment, the teaching material is generated after the social circumstance and the contextual situation are selected. In some embodiments, however, when the social circumstance is selected, the teaching material corresponding to the selected social circumstance under all contextual situations can be generated first. Then, when the contextual situation is selected, the teaching material corresponding to the selected contextual situation is retrieved from the previously generated teaching material.

Figure 4:
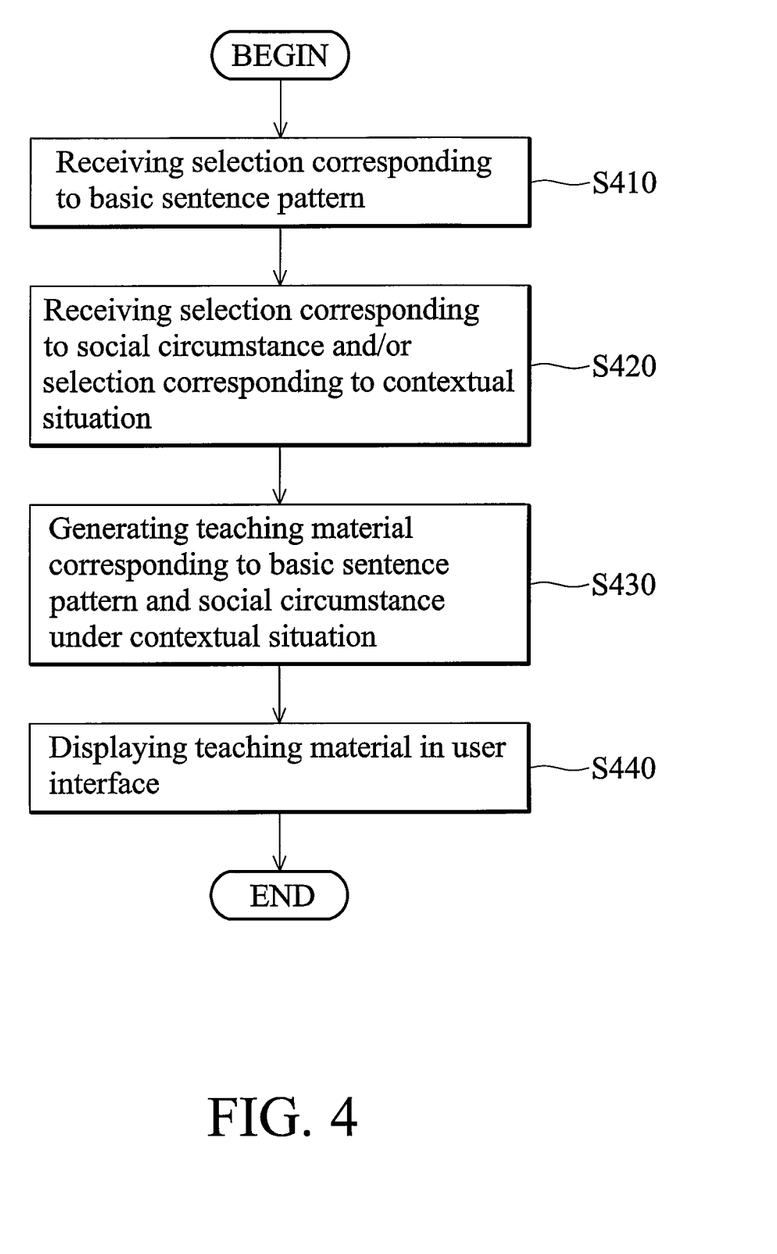
FIG. 4 is a flowchart of still another embodiment of a teaching material generation method according to the invention.

FIG. 4 is a flowchart of an embodiment of a teaching material generation method according to the invention. In this embodiment, users can learn a specific basic sentence pattern for various social circumstances and/or contextual situations.

In step S410, a selection corresponding to at least one of a plurality of basic sentence patterns is received. In step S420, selections corresponding to at least one of a plurality of social circumstances and/or a selection corresponding to at least one of a plurality of contextual situations are received. In step S430, teaching material under the selected basic sentence pattern is generated according to the selected social circumstance and/or the selected contextual situation, and in step S440, the generated teaching material is displayed in the user interface. Similarity, the auxiliary teaching material can be also retrieved from the storage module according to the generated teaching material, and displayed in the user interface. In some embodiments, when the basic sentence pattern is selected, the teaching material corresponding to all social circumstances and all contextual situations can be generated first. Then, when the desired social circumstance and/or the contextual situation are selected, the teaching material is further sifted from the previously generated teaching material.

Figure 5:
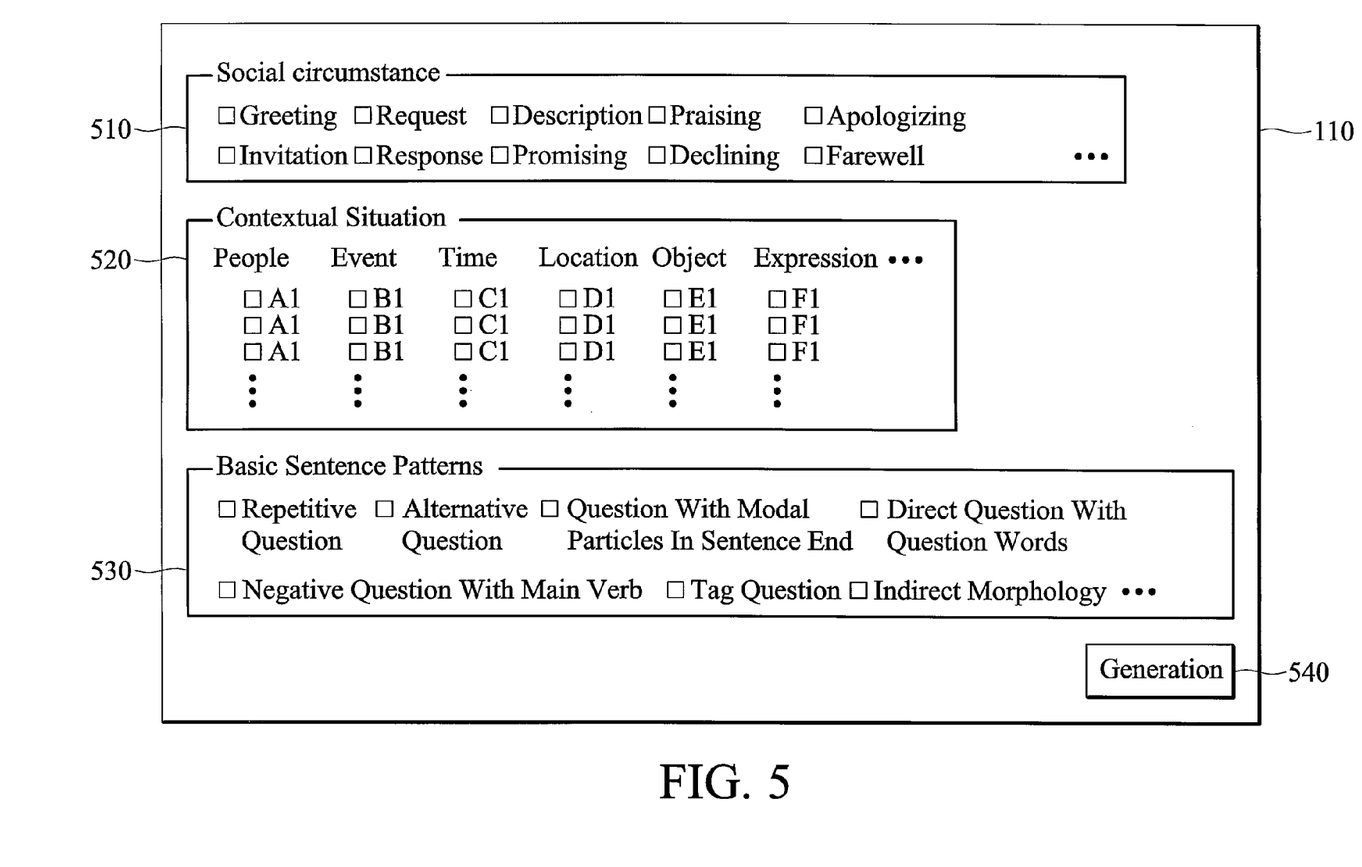
FIG. 5 is a schematic diagram illustrating an embodiment of a user interface according to the invention.

FIG. 5 is a schematic diagram illustrating an embodiment of a user interface according to the invention.

As shown in FIG. 5, the user interface 110 comprises a selection area for social circumstances 510, a selection area for contextual situations 520, and a selection area for basic sentence patterns 530. The selection area for social circumstances 510 comprises various social circumstances, such as greetings, requests, descriptions, praising, apologizing, invitations, responses, promising, declining, farewell, and others. The selection area for contextual situations 520 comprises various contextual situations, such as people (A1, A2 and A3 represent different type of people), events (B1, B2 and B3 represent different type of events), time (C1, C2 and C3 represent different times), location (D1, D2 and D3 represent different locations), object (E1, E2 and E3 represent different objects), and expressions (F1, F2 and F3 represent different expressions). The selection area for basic sentence patterns 530 comprises various basic sentence patterns, such as repetitive questions, alternative questions, questions with modal particles at the end of sentences, direct questions with question words, negative questions with main verbs, tag questions, indirect morphology, and others. It is noted that a selection box may be provided in front of respective indices, and two or more selection boxes can be selected. An index is selected if the corresponding selection box is selected. After the indices are selected, users can select a generation key 540, enabling the system to begin generating teaching material according to the selected indices. It is understood that the user interface in FIG. 5 is an example, and not limited thereto. There may be various designs for the user interface. For example, the social circumstances, the contextual situations, and the basic sentence patterns may be displayed in different pages in the user interface.

Examples of teaching material comprising question and response sentences under specific contextual situations follow. It is understood that, the teaching material may be listed in two languages such as Chinese and English to help learners to understand the semantics of the teaching material.

Figure 6A:
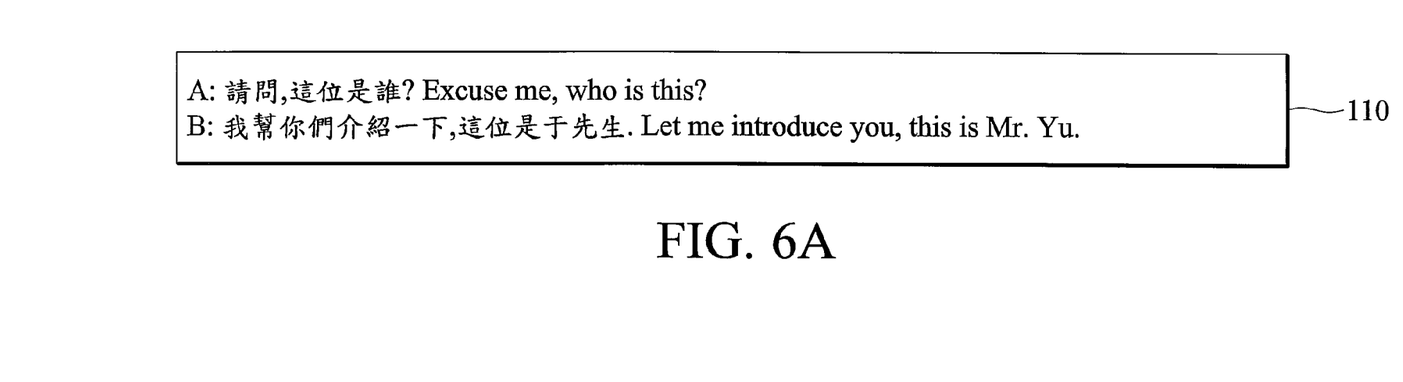
FIGS. 6A and 6B are examples of teaching material comprising question and response when the contextual situation is 'people' according to an embodiment of the invention.
Figure 6B:
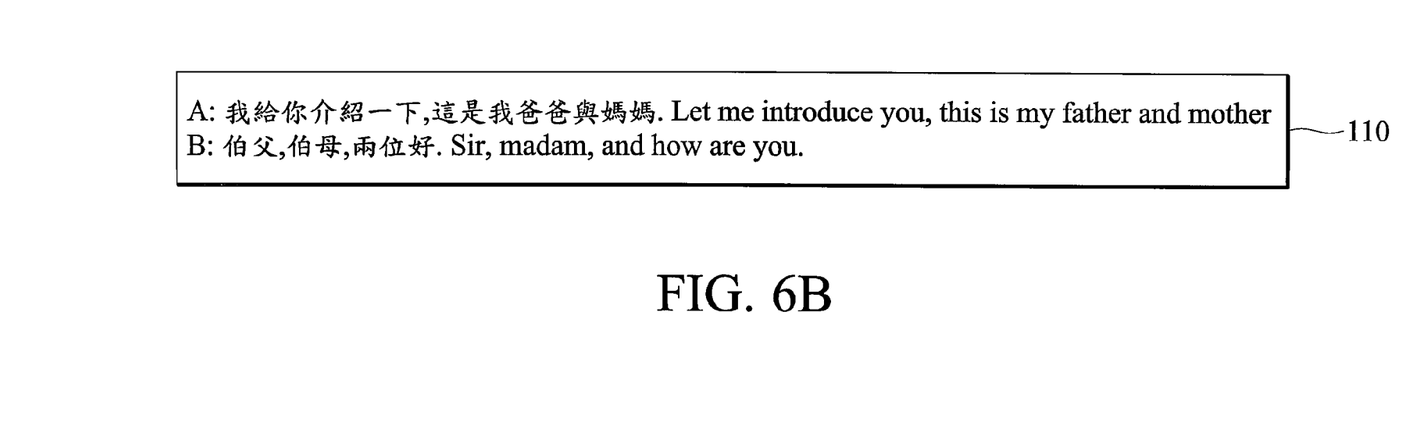
Figure 7A:
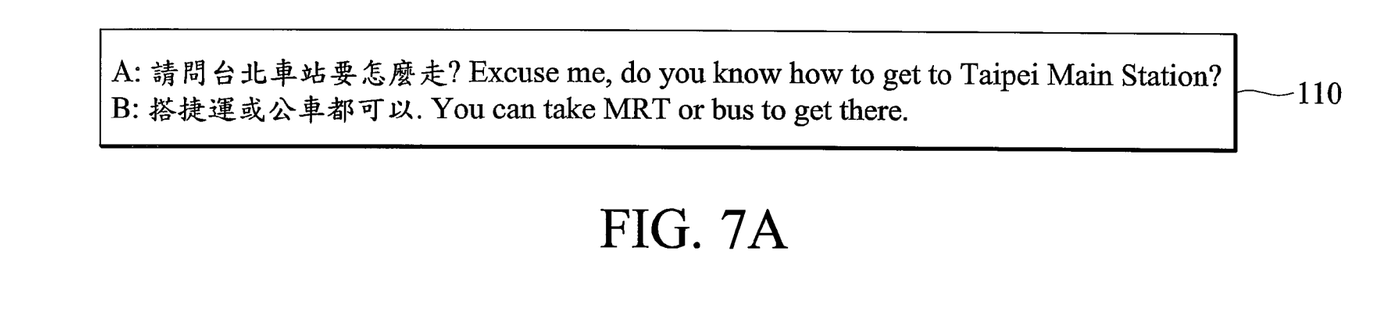
FIGS. 7A and 7B are examples of teaching material comprising question and response when the contextual situation is 'event' according to an embodiment of the invention.
Figure 7B:
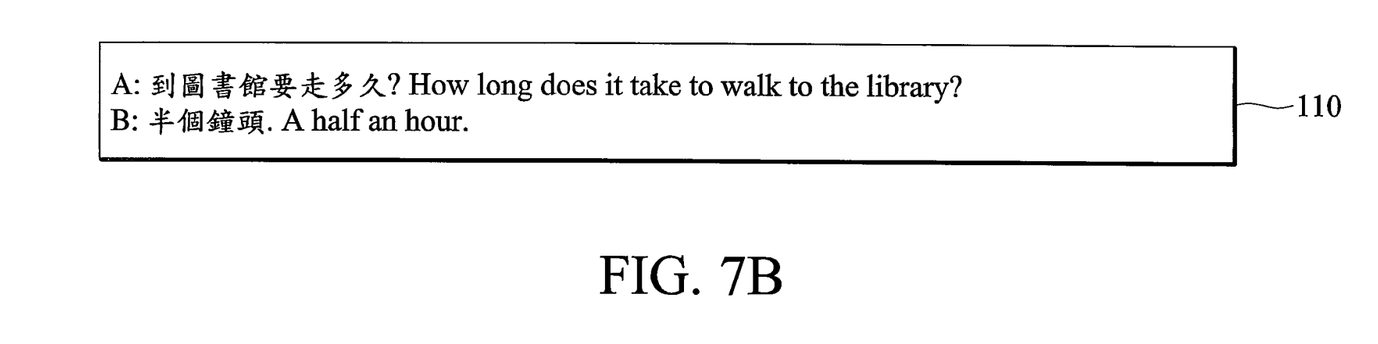
Figure 8A:
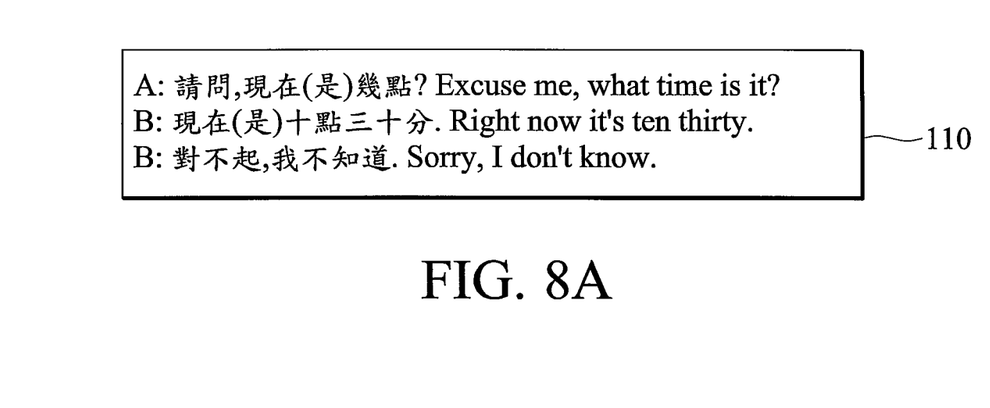
FIGS. 8A and 8B are examples of teaching material comprising question and response when the contextual situation is 'time' according to an embodiment of the invention.
Figure 8B:
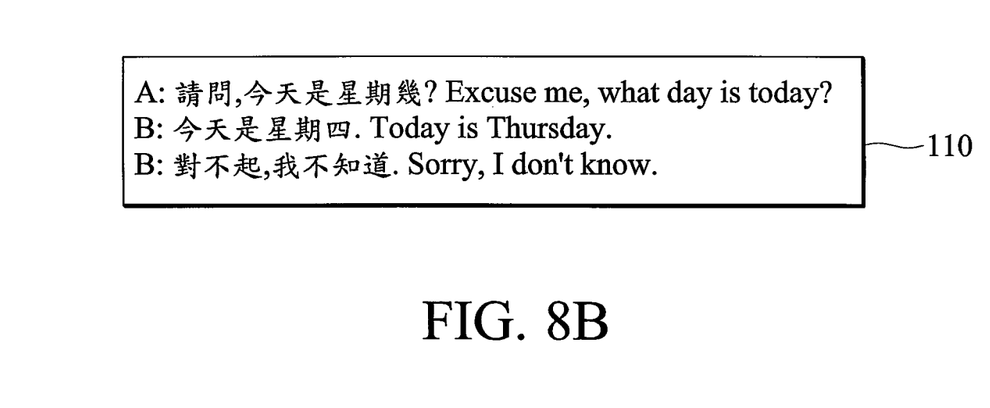
Figure 9A:
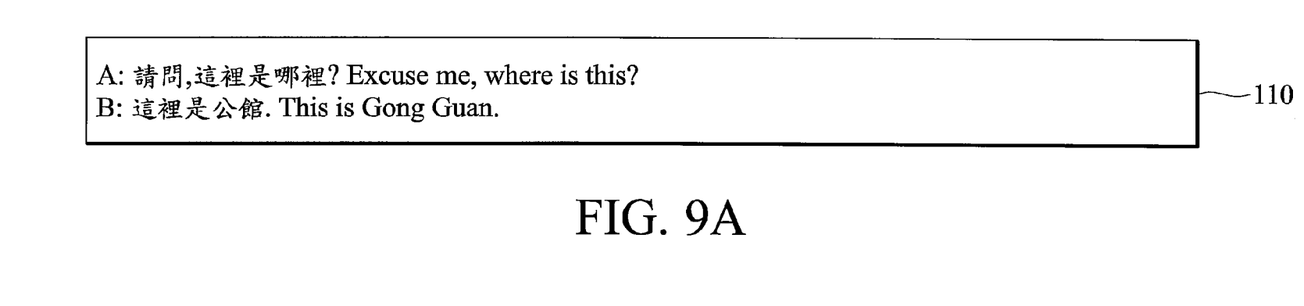
FIGS. 9A and 9B are examples of teaching material comprising question and response when the contextual situation is 'location' according to an embodiment of the invention.
Figure 9B:
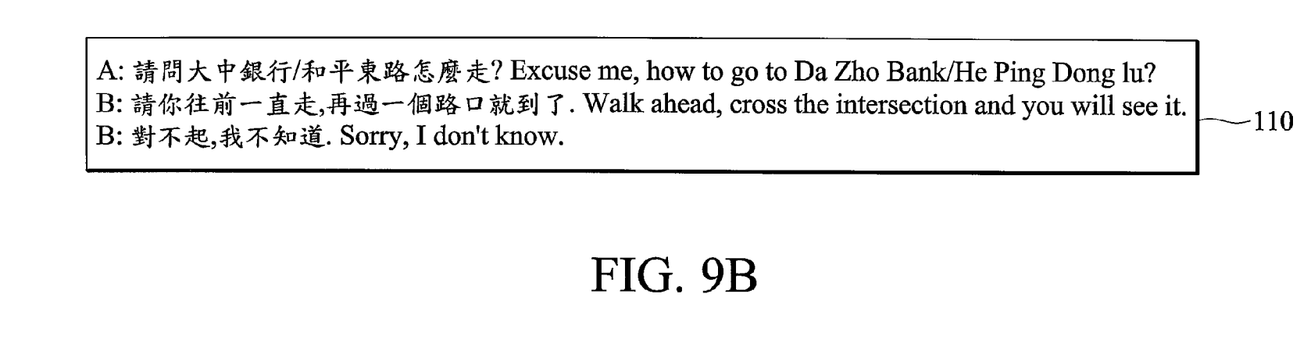
Figure 10A:
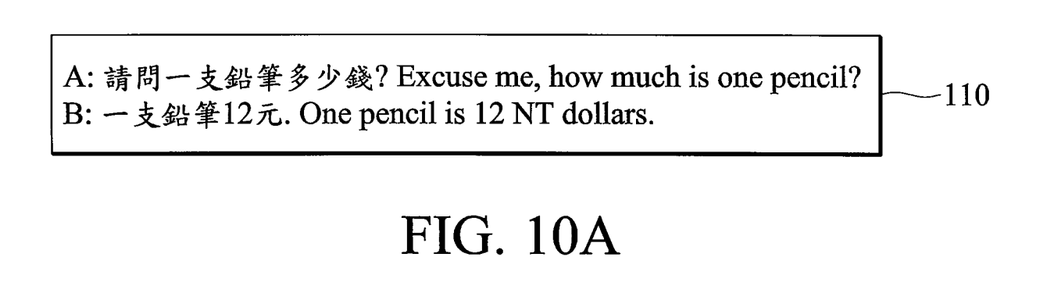
FIGS. 10A and 10B are examples of teaching material comprising question and response when the contextual situation is 'object' according to an embodiment of the invention.
Figure 10B:
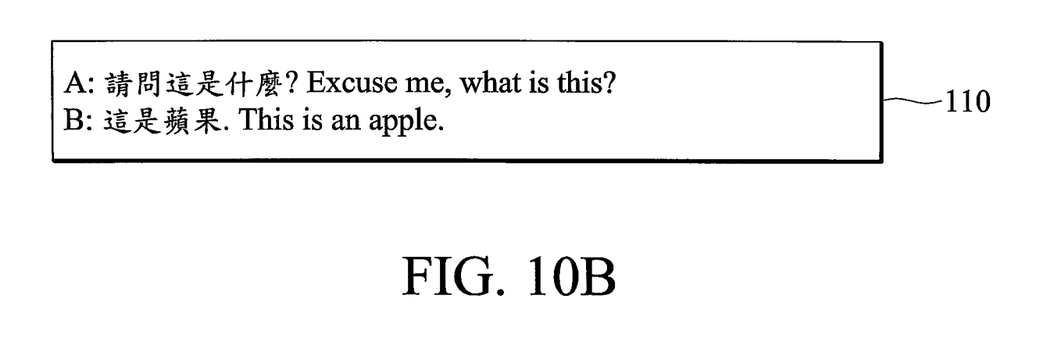

When 'unspecified target' of 'people' in the contextual situation is selected, the system generates teaching material of "A: 請問, 這位是誰？ Excuse me, who is this?" and "B: 我幫你們介紹一下, 這位是于先生. Let me introduce you, this is Mr. Yu." as shown in FIG. 6A. It is noted that FIG. 6A shows a display of the interface 110 of the example of teaching material. When 'elder' of 'people' in the contextual situation is selected, the system generates teaching material of "A: 我給你介紹一下,, 這是我爸爸與媽媽. Let me introduce you, this is my father and mother." and "B: 伯父,伯母,, 兩位好.. Sir, madam, and how are you." as shown in FIG. 6B. When 'asking for directions' of 'event' in the contextual situation is selected, the system generates teaching material of "A: 請問台北車 站要怎麼走?? Excuse me, do you know how to get to Taipei Main Station?" and "B: 搭捷 運或公車都可以.. You can take MRT or bus to get there." as shown in FIG. 7A, or "A: 到 圖書館要走多久？ How long does it take to walk to the library?" and "B: 半個鐘頭.. A half an hour." as shown in FIG. 7B. When 'asking time' of 'time' in the contextual situation is selected, the system generates teaching material of "A: 請問,, 現在(是)幾點?? Excuse me, what time is it?", "B: 現在(是)十點三十分. Right now it's ten thirty." and "B: 對不起,我不知道. Sorry, I don't know." as shown in FIG. 8A. When 'asking date' of 'time' in the contextual situation is selected, the system generates teaching material of "A: 請問, 今天是星期幾？ Excuse me, what day is today?", "B: 今天是星期四. Today is Thursday." and "B: 對不起,, 我不知道.. Sorry, I don't know." as shown in FIG. 8B. When 'unspecified target' of 'location' in the contextual situation is selected, the system generates teaching material of "A: 請問, 這裡是哪裡？ Excuse me, where is this?" and "B: 這裡是公館.. This is Gong Guan." as shown in FIG. 9A. When 'specified target' of 'location' in the contextual situation is selected, the system generates teaching materials of "A: 請問大中銀行/和 平東路怎麼走？ Excuse me, how to go to Da Zho Bank/He Ping Dong lu?", "B: 請你往前一直 走, 再過一個路 口就到了. Walk ahead, cross the intersection and you will see it." and "B: 對不起, 我不知道. Sorry, I don't know." as shown in FIG. 9B. When 'specified target' of 'object' in the contextual situation is selected, the system generates teaching material of "A: 請問一支鉛筆多少 錢？ Excuse me, how much is one pencil?" and "B: 一支鉛筆12元.. One pencil is 12 NT dollars.", as shown in FIG. 10A. When 'unspecified target' of 'object' in the contextual situation is selected, the system generates teaching material of "A: 請問這 是什麼？ Excuse me, what is this?" and "B: 這是蘋果. This is an apple." as shown in FIG. 10B. It is understood that, the above teaching material are only examples in this embodiments. Related auxiliary teaching material such as vocabulary and grammar used in the teaching material may be also displayed in the user interface.

Teaching material generation methods and systems, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention, shall be defined and protected by the following claims and their equivalents.

What is claimed is:

1. A teaching material generation method for languages, comprising:
providing, in a storage module, a plurality of social circumstances and a plurality of contextual situations, wherein the contextual situations comprise people, event, time, location, objects, or expressions, and wherein the social circumstances comprise greetings, requests, descriptions, praising, apologizing, invitations, responses, promising, declining, or farewell;
receiving, by a user interface, a selection corresponding to at least one of the social circumstances;
receiving, by the user interface, a selection corresponding to at least two of the contextual situations; and
generating, by a processing module, teaching material, according to the selected social circumstance and the selected contextual situations.

2. The method of claim 1, wherein the teaching material correspond to the selected contextual situation under the selected social circumstance.

3. The method of claim 2, further comprising generating the teaching material comprising at least one group of question and response sentences under the selected contextual situation, thereby handling the selected social circumstance defined by the selected contextual situation.

4. The method of claim 3, further comprising:
providing a plurality of basic sentence patterns;
receiving a selection corresponding to at least one of the basic sentence patterns; and
generating the teaching material corresponding to the selected basic sentence pattern according to the selected social circumstance and the selected contextual situation.

5. The method of claim 4, wherein the basic sentence patterns comprise repetitive questions, alternative questions, questions with modal particles at the end of sentences, direct questions with question words, negative questions with main verbs, tag questions, or indirect morphology.

6. The method of claim 1, further comprising generating characters, vocabulary, explanations, sample sentences, or grammar theory corresponding to the teaching material.

7. A teaching material generation method for a specific language, comprising:
providing, in a storage module, a plurality of social circumstances and a plurality of contextual situations, wherein the contextual situations comprise people, event, time, location, objects, or expressions, and the social circumstances comprise greetings, requests, descriptions, praising, apologizing, invitations, responses, promising, declining, or farewell;

providing, in a storage module, a plurality of basic sentence patterns;

receiving, by a user interface, a selection corresponding to at least one of the basic sentence patterns;

receiving, by the user interface, a selection corresponding to at least one of the social circumstances;

receiving, by the user interface, a selection corresponding to at least one of the contextual situations; and generating, by a processing module, teaching material corresponding to the selected basic sentence pattern according to the social circumstances and the contextual situations.

8. The method of claim 7, further comprising:

receiving a selection corresponding to at least one of the social circumstances or the contextual situations; and generating the teaching material corresponding to the selected basic sentence pattern according to the selected social circumstance or the selected contextual situation.

9. The method of claim 7, further comprising:

receiving a selection corresponding to at least one of the social circumstances;

receiving a selection corresponding to at least one of the contextual situations; and generating the teaching material corresponding to the selected basic sentence pattern and the selected contextual situation under the selected social circumstance.

10. The method of claim 9, further comprising generating the teaching material comprising at least one group of question and response sentences under the selected contextual situation, thereby handling the selected social circumstance defined by the selected contextual situation.

11. The method of claim 7, wherein the basic sentence patterns comprise repetitive questions, alternative questions, questions with modal particles at the end of sentences, direct questions with question words, negative questions with main verbs, tag questions, or indirect morphology.

12. The method of claim 7, further comprising generating characters, vocabulary, explanations, sample sentences, or grammar theory corresponding to the teaching material.

13. A system for generating teaching material for a specific language, comprising:

a storage module, comprising a plurality of social circumstances and a plurality of contextual situations, wherein:

the social circumstances comprise greetings, requests, descriptions, praising, apologizing, invitations, responses, promising, declining, or farewell; and the contextual situations comprise people, event, time, location, objects, or expressions;

a user interface, receiving a selection corresponding to at least one of the social circumstances, and receiving a selection corresponding to at least two of the contextual situations; and a processing module, generating teaching material according to the selected social circumstance and the selected contextual situations.

14. The system of claim 13, wherein the processing module further generates at least one group of question and response sentences for the teaching material under the selected contextual situation, thereby handling the selected social circumstance defined by the selected contextual situation.

15. The system of claim 14, wherein the storage module further comprises a plurality of basic sentence patterns, receiving a selection corresponding to at least one of the basic sentence patterns by the user interface, and generating the teaching material corresponding to the selected basic sentence pattern according to the selected social circumstance and the selected contextual situation by the processing module.

16. The system of claim 13, wherein the processing module further generates characters, vocabulary, explanations, sample sentences, or grammar theory corresponding to the teaching material.

17. A system for generating teaching material for a specific language, comprising:

a storage module, comprising a plurality of social circumstances and a plurality of contextual situations, and a plurality of basic sentence patterns, wherein:

the social circumstances comprise greetings, requests, descriptions, praising, apologizing, invitations, responses, promising, declining, or farewell; and the contextual situations comprise people, event, time, location, objects, or expressions;

a user interface, receiving a selection corresponding to at least one of the basic sentence patterns;

receiving, by the user interface, a selection corresponding to at least one of the social circumstances;

receiving, by the user interface, a selection corresponding to at least one of the contextual situations; and a processing module, generating teaching material corresponding to the selected basic sentence pattern according to the social circumstances and the contextual situations.

18. The system of claim 17, wherein the user interface further receives a selection corresponding to at least one of the social circumstances or the contextual situations, and the processing module generates the teaching material corresponding to the selected basic sentence pattern according to the selected social circumstance or the selected contextual situation.

19. The system of claim 17, wherein the processing module further generates at least one group of question and response sentences for the teaching material under the selected contextual situation, thereby handling the selected social circumstance defined by the selected contextual situation.

20. The system of claim 16, wherein the processing module further generates characters, vocabulary, explanations, sample sentences, or grammar theory corresponding to the teaching material.

21. A non-transitory machine-readable storage medium comprising a computer program, which, when executed, causes a device to perform a teaching material generation method, and the method comprising:

receiving a selection corresponding to at least one of a plurality of social circumstances, wherein the social circumstances comprise greetings, requests, descriptions, praising, apologizing, invitations, responses, promising, declining, or farewell;

receiving a selection corresponding to at least two of a plurality of contextual situations, wherein the contextual situations comprise people, event, time, location, objects, or expressions; and generating teaching material according to the selected social circumstance and the selected contextual situations.

22. The method of claim 1, wherein the user interface allows the simultaneous selection of multiple contextual situations and multiple social circumstances, and the processing module generates teaching material according to the multiple selected social circumstances and contextual situations.

23. The method of claim 7, wherein the user interface allows the simultaneous selection of multiple contextual situations and multiple social circumstances, and the processing module generates teaching material according to the multiple selected social circumstances and contextual situations.

24. The system of claim 13, wherein the user interface allows the simultaneous selection of multiple contextual situations and multiple social circumstances, and the processing module generates teaching material according to the multiple selected social circumstances and contextual situations.

25. The system of claim 17, wherein the user interface allows the simultaneous selection of multiple contextual situations and multiple social circumstances, and the processing module generates teaching material according to the multiple selected social circumstances and contextual situations.

26. The non-transitory machine-readable storage medium of claim 21, wherein the method comprises the simultaneous selection of multiple contextual situations and multiple social circumstances, and the generation of teaching material according to the multiple selected social circumstances and contextual situations.

* * * * *